United States Patent [19]
Bisset et al.

[11] Patent Number: 5,920,309
[45] Date of Patent: Jul. 6, 1999

[54] TOUCH SENSING METHOD AND APPARATUS

[75] Inventors: Stephen J. Bisset, Palo Alto; Bernard Kasser, Menlo Park; Berni Joss, Palo Alto, all of Calif.; Aleksey Tareyev, Vlyanovsk, Russian Federation

[73] Assignee: Logitech, Inc., Fremont, Calif.

[21] Appl. No.: 08/582,769

[22] Filed: Jan. 4, 1996

[51] Int. Cl.[6] .................................................. E08C 21/00
[52] U.S. Cl. ...................... 345/173; 345/156; 345/179; 178/18.06; 178/20.04
[58] Field of Search ........................... 178/18.06, 20.04; 345/156, 173, 174, 179

[56] References Cited

U.S. PATENT DOCUMENTS

| | | | |
|---|---|---|---|
| 3,886,311 | 5/1975 | Rogers et al. ............................ | 178/18 |
| 3,921,166 | 11/1975 | Volpe . | |
| 4,103,252 | 7/1978 | Bobick . | |
| 4,455,452 | 6/1984 | Schuyler . | |
| 4,550,221 | 10/1985 | Mabusth .................................. | 178/18 |
| 4,639,720 | 1/1987 | Rympalski et al. . | |
| 4,686,332 | 8/1987 | Greanias et al. ......................... | 178/19 |
| 4,733,222 | 3/1988 | Evans . | |
| 4,736,191 | 4/1988 | Matzke et al. . | |
| 5,016,008 | 5/1991 | Gruaz et al. . | |
| 5,648,642 | 7/1997 | Miller et al. ............................. | 178/18 |
| 5,825,351 | 10/1998 | Tam ......................................... | 345/173 |
| 5,825,352 | 10/1998 | Bisset et al. ............................. | 345/173 |

FOREIGN PATENT DOCUMENTS

WO 91/03039  3/1991  WIPO .

OTHER PUBLICATIONS

Synaptics Brochure, "Synaptics Touch Pad," pp. 1–39.

*Primary Examiner*—Mark R. Powell
*Assistant Examiner*—Vincent E. Kovalick
*Attorney, Agent, or Firm*—Townsend and Townsend and Crew LLP

[57] ABSTRACT

Method and apparatus for sensing the simultaneous proximity of one or more fingers or other appropriate objects to a capacitive touch sensor. A modulator/demodulator pair drive and sense either a single trace or a pair of traces. In a dual trace embodiment, differentially sensed signals are then peak detected converted from voltage to current. The output signal is then calibrated to adjust for trace variations, followed by appropriate gain and level shifting, and analog-to-digital conversion for use as the input to a microcontroller.

14 Claims, 7 Drawing Sheets

TOUCH SENSING METHOD AND APPARATUS

FIELD OF THE INVENTION

The present invention relates generally to touchpad devices, and more particularly relates to method and apparatus for capacitive sensing touchpad devices.

BACKGROUND OF THE INVENTION

Touch sensing devices are well known, and take a number of different forms. Perhaps the best known are resistive-membrane position sensors, which have been used in a number of different applications for many years. Such devices have been used as keyboards, position indicators, and so forth. Other types of touch sensing devices include resistive tablets, surface acoustic wave devices, touch sensors based on strain gages or pressure sensors, and optical sensors.

Yet another touch sensing technology is capacitive sensing, in which the location of a finger (or in some instances another object such as a stylus) over a sensing device is determined by virtue of variations in capacitance under and around the location of the finger. Typical of capacitive touch sensing devices are touch screens and capacitive pads which employ a matrix of row and column electrodes and detect, for example, either the transcapacitance between row and column electrodes or the effective capacitance to virtual ground. Other capacitive techniques are also known. Some touch sensitive devices are known to use interpolation for more precisely identifying the location of a finger or stylus.

SUMMARY OF THE INVENTION

The present invention provides a novel method and apparatus for sensing the simultaneous proximity of one or more fingers or other appropriate objects to a touch sensor. A related application is the method and apparatus described in the U.S. patent application Ser. No. 08/582,768, entitled Multi-contact Sensing Method and Apparatus, having as inventors Stephen Bisset and Bernard Kasser, filed on even date herewith and assigned to the assignee of the present invention, the relevant portions of which are incorporated herein by reference.

In an exemplary embodiment, a touch sensor has a matrix of rows and columns of conductors such as described in U.S. patent application Ser. No. 08/478,290, entitled Touch Sensing Method and Apparatus, filed Jun. 7, 1995, and assigned to the assignee of the present application. Depending on the implementation, a microcontroller selects either one or two traces of the matrix for sensing. For purposes of clarity, a two trace implementation will be described in detail herein.

A modulator drives the two selected traces through a two channel analog multiplexor. The modulator drives the two traces with bipolar currents having a 180° phase difference, which results at the output in two triangular waves. The voltage amplitude of the triangular wave depends on the capacitance associated with the selected traces—including any capacitance due to finger loading—so that the voltage amplitude of the waveform provides an indication of the presence of a finger or other appropriate device.

A demodulator, which is clocked by a control clock 90° out of phase (or in quadrature) with the control clock of the modulator, then samples the two triangular waves and generates a pair of current outputs representative of the positive and negative peaks of the waveforms. The touch sensor is thus synchronously driven and sensed. The result is then simplified by subtracting the nominal amplitude and converting the differential voltage signal to a current signal. The signal is amplified and low pass filtered, and then converted to a digital signal by an analog to digital converter. The resulting signal may be supplied to a host for conventional processing to yield cursor control signals.

The two trace detection system summarized above may be simplified to a single trace system by eliminating one of the two channels of the analog mux, and the second channel of the modulator and demodulator.

The capacitive sensing system of the present invention is particularly suited to detection of one or more fingers in proximate relationship with the sensor.

In a special condition, the touch sensing system of the present invention can detect, substantially instantaneously, the presence of a finger or other appropriate object in proximate contact with a touch sensor. A plurality of traces, spaced substantially uniformly throughout the sensor in a manner sufficient to be representative of the sensor as a whole, is simultaneously driven. The responsive signals from the traces are then sensed. While the response cannot indicate the location of a finger on the touchpad, the response does immediately indicate whether a finger, pen or other stylus or appropriate object is in proximate contact with the touch sensor.

It is therefore one object of the present invention to provide a touchpad system capable of detecting a plurality of contacts such as fingers.

It is a further object of the present invention to provide a dual trace capacitive sensing system.

It is a further object of the present invention to provide a single trace capacitive sensing system.

It is another object of the present invention to synchronously drive and sense a touch sensor.

It is yet a further object of the present invention to detect the presence of a passive or active pen or other metallic or dielectric objects.

It is a further object of the present invention to drive and sense one or more traces of a touch sensor through the use of quadrature signals.

It is a still further object of the present invention to substantially immediately detect the presence of a finger or other appropriate object in proximate contact to a touch sensor by simultaneously driving and sensing a plurality of traces sufficient to represent the entirety of the touch sensor.

These and other objects of the invention may be better appreciated from the following detailed description of the invention, taken together with the appended figures.

THE FIGURES

DETAILED DESCRIPTION OF THE INVENTION

Figure 1:
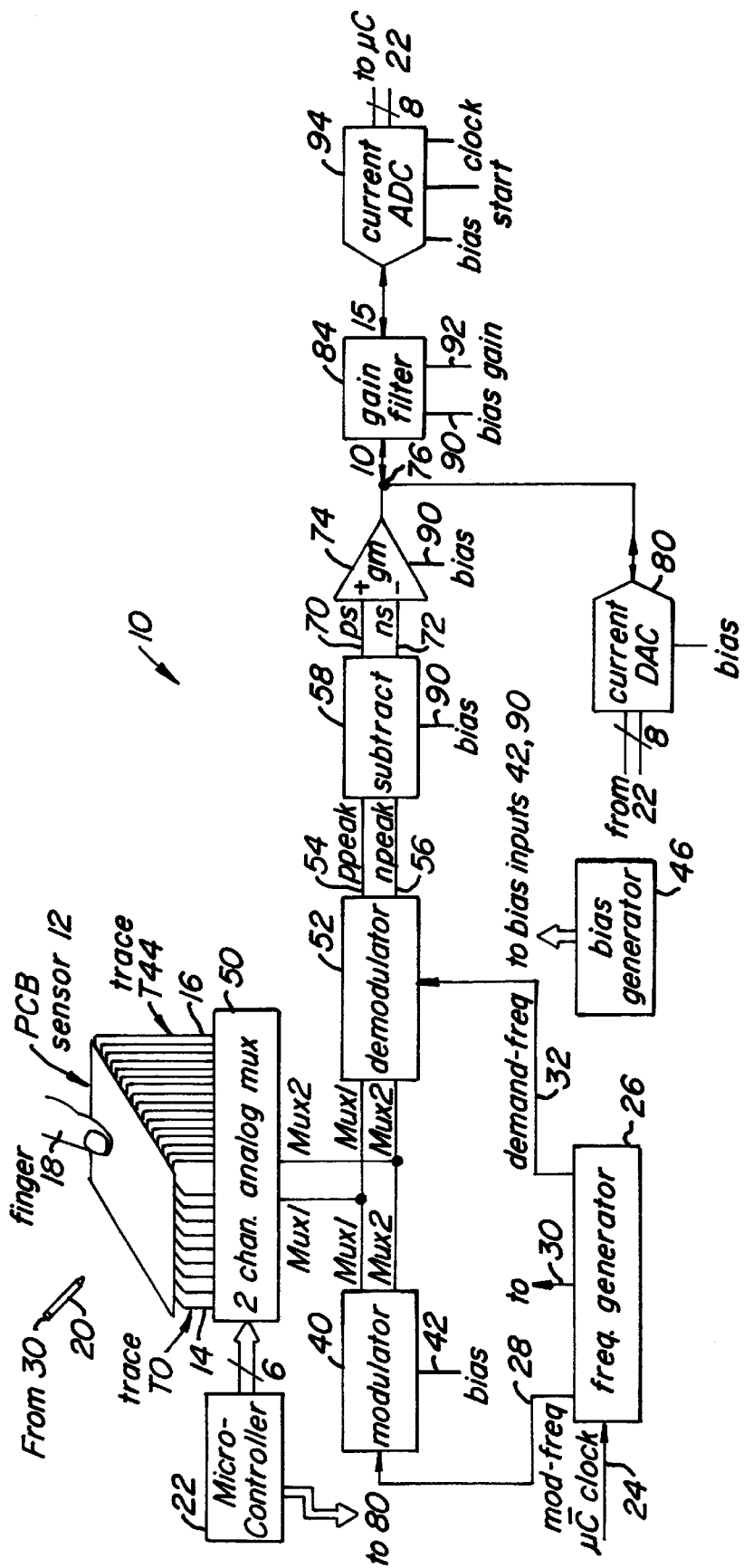
FIG. 1 shows in schematic block diagram form a generalized form of the system of the present invention.
Figure 2:
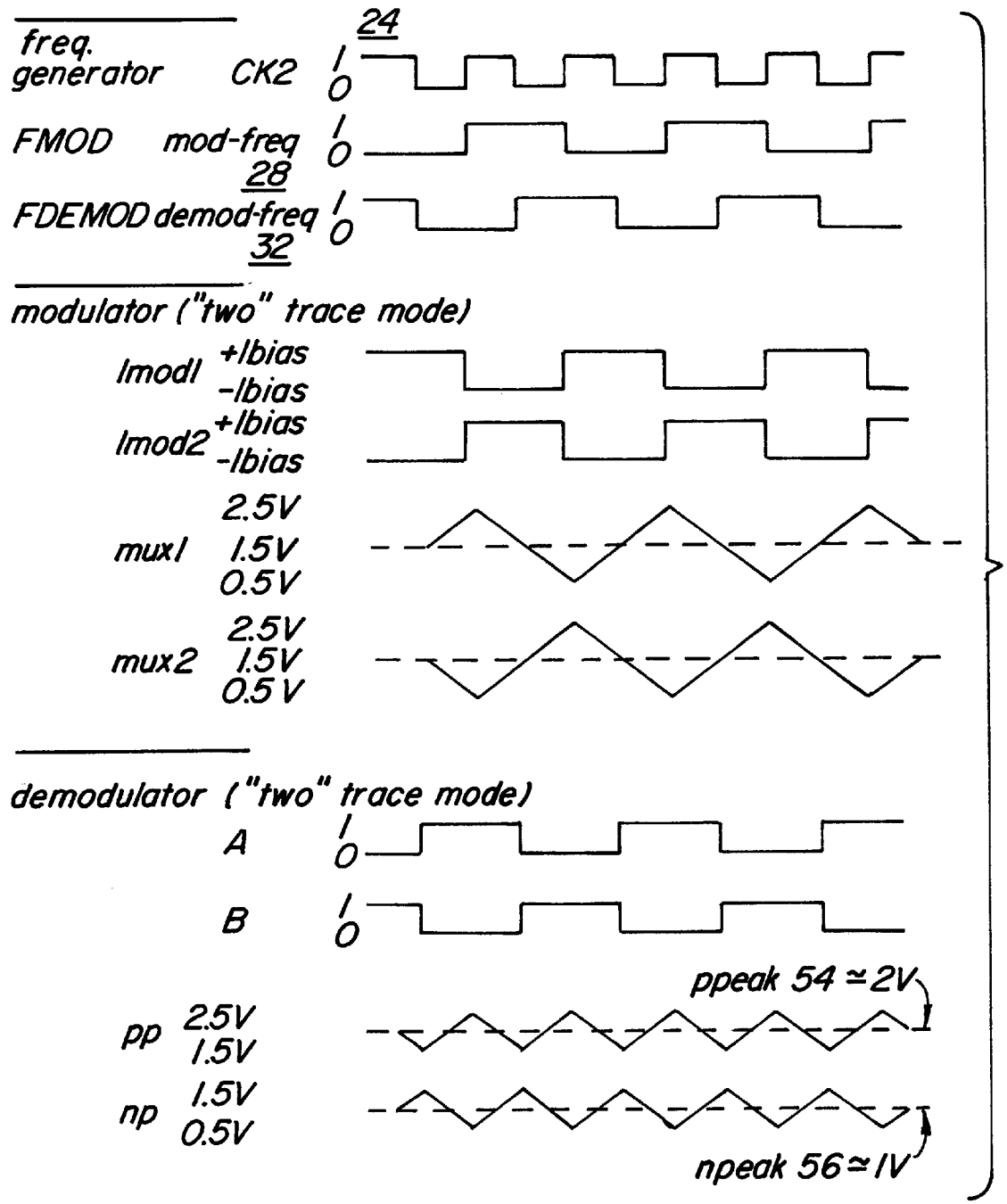
FIG. 2 shows the waveforms which occur at various points in the schematic of FIG. 1.

Referring first to FIG. 1 taken in conjunction with the waveforms shown in FIG. 2, a capacitive touch sensing system 10 in accordance with the present invention is shown in block diagram form. An exemplary touch sensor 12 (typically fabricated through printed circuit board techniques, through the use of other thin conductors on a transparent dielectric, or through other suitable techniques) comprises a plurality of traces arranged in an X-Y matrix of rows 14 and columns 16. For an exemplary embodiment, a total of forty-five equally spaced traces (T0 through T44) may be arranged in an appropriate number of rows and columns suited to the desired aspect ratio, for example two by three. One or more fingers 18, or a pen or other stylus 20, may be placed in proximate relationship with the sensor 12, causing a change in the capacitance of the traces closest to the finger(s) or pen. In some embodiments less than all of the available traces may be used.

A microcontroller 22 provides a clock signal 24, having the waveform CK2 shown in FIG. 2, to a frequency generator 26. The frequency generator 26 generates a modulator frequency signal 28 (shown as $F_{mod}$ in FIG. 2), a phase programmable clock signal 30 for use with the pen 20, and a demodulator frequency signal 32 (shown as $F_{demod}$ in FIG. 3). The modulator frequency signal 28 is supplied to a modulator 40, which is also provided with a bias signal 42. The bias signal 42, and all other bias signals discussed hereinafter, are supplied by a central bias generator cell 46. In an exemplary embodiment, the bias currents are fixed, but in an alternative embodiment each of the bias currents provided by the bias generator cell 46 may be programmable by means of a three bit word, with a resistor $R_{REF}$ connected to ground as the main current reference.

The modulator 40 provides a pair of current drive signals $I_{MOD1}$ and $I_{MOD2}$ on lines Mux1 and Mux2 to a selected pair of traces 14 or 16 via a two channel analog mux 50. Traces not selected are driven with a low impedance to ground, although such grounding may not be necessary in all instances. The microcontroller 22 provides control signals to the mux 50 to select the traces to be driven and sensed. The signals $I_{MOD1}$ and $I_{MOD2}$ are opposing current signal$_{BIAS}$+I and $_{BIAS}$–I which alternate polarity every half cycle of the frequency modulator signal 28, as shown in FIG. 2 and further discussed in connection with FIG. 4. During the drive portion of the cycle, the currents are +$I_{BIAS}$ into Mux1 and –$I_{BIAS}$ into Mux2; and between drive portions of the cycle the signals are –$I_{BIAS}$ into Mux1 and +$I_{BIAS}$ into Mux2.

In an exemplary embodiment which drives and senses two traces, the mux 50 selects adjacent traces. This permits multiple fingers to be identified, and in addition allows the relative movement of a finger to be monitored. However, in some embodiments it may be desirable to permit the mux 50 to select other than adjacent traces; for example, driving and sensing T14 and T17, which may both be X traces but are not adjacent. In other embodiments, it may be preferred to drive one or more X traces and sense one or more Y traces; for example, driving T5 (an X trace) and sensing T32 (a Y trace). In such an arrangement the selection of traces permits several fingers to be distinguished, allowing other features to be implemented. Although orthogonal traces are typically used, it is not necessary in all instances; moreover, in some instances some traces may be reserved for special purpose use, such as button functions or the like.

In another feature, it is possible to selectively drive and sense a plurality of traces, sufficient to represent the entire pad, to identify whether a finger has been placed down anywhere on the pad. Although this detection is not in all embodiments sufficient to give the type of finger profile used in the remainder of the invention, this detection feature permits the system to determine whether to come out of a low power, or sleep, mode. To implement this feature, the analog mux 50 includes a special mode for selection of, for example, one of every three traces. All of these traces are then driven and sensed simultaneously, such that the presence of a finger anywhere on the pad is substantially immediately detected, i.e., in many fewer scans than would be required to develop a finger profile.

In response to the square wave drive currents $I_{MOD1}$ and $I_{MOD2}$ into the lines Mux1 and Mux2, the capacitance of the traces being sensed generates triangular sense signals on those same lines Mux1 and Mux2. The triangular signals on the lines Mux1 and Mux2 are shown in FIG. 2, and can be seen to be 180° out of phase. The amplitudes of the sensed signals on the lines Mux1 and Mux2 decrease when the capacitance on the sensed traces increases due to the presence of a finger proximate to the trace; i.e., when the capacitance on either the Mux1 and/or the Mux2 line increases.

The sensed signals on the Mux1 and Mux2 lines are supplied to a demodulator circuit 52. The demodulator 52 (described in greater detail in connection with FIG. 5) is supplied with a demodulator frequency signal 32. As can be better appreciated from FIG. 2, The demodulator frequency signal 32 is 90° out of phase from the modulator frequency 28; alternatively, the signals 28 and 32 may be considered to be in quadrature.

The demodulator 52 samples the two sense waveforms and generates two outputs representing the respective positive and negative peaks, indicated as "ppeak" and "npeak" on lines 54 and 56, shown in FIG. 2. The value of ppeak decreases when a finger is touching the sensor 12, while the value of npeak increases when a finger is touching. The ppeak and npeak signals are provided to a subtractor circuit 58, described in greater detail in connection with FIG. 6. The basic function of the subtractor circuit 58 is to serve as a level shifter which subtracts the relatively large constant base signal from $V_{ppeak}$ and $V_{npeak}$. The resulting signals PS and NS, on lines 70 and 72, respectively, are supplied to the positive and negative inputs of a differential pair 74. The differential pair 74 may be a standard CMOS differential pair with a "tail current mirror." The differential pair 74 converts the differential inputs PS and NS to a current signal, available at point 76, for further processing. In an exemplary embodiment, the conversion to a current signal is made to decrease noise sensitivity and to simplify the design by eliminating the need for op amps and feedback loops. However, such conversion is not necessary in all embodiments.

The output of the differential pair 74 is added to the output of a current DAC 80 at point 76 to form a bipolar output current $I_0$. The DAC 80 receives calibration data from the microcontroller 22; the calibration data, which is developed in a conventional manner compensates for trace-to-trace mismatches and offsets. The summation signal $I_0$ is supplied as a signal to a multi-stage gain filter 84, and may for example comprise five programmable stages. The stages of the gain filter 84 each provide a low-pass response, and each stage is provided with an associated bias signal shown collectively as 90 and an associated gain signal shown collectively as 92.

The gain filter 84 is discussed in greater detail hereinafter in connection with FIGS. 8A and 8B. The gain filter 84 functions generally to amplify the signal $I_O$, with the gain typically in the range of three to perhaps more than one hundred, and the resulting signal $I_5$ is supplied to a current analog to digital converter 94. The ADC 94 (described in greater detail hereinafter in connection with FIG. 9) operates on successive approximations by comparing the to-be-converted current $I_5$ with the bipolar output current of a current switching DAC included within the ADC circuit 94. The currents are then summed and the sum is compared with zero by means of a Schmitt trigger. An output level shifter then converts the Schmitt trigger output from the value of the analog supply to that of the digital supply. The ADC 94 is provided with a bias signal 96, a start signal 98 and a clock signal 100. The output of the ADC 94, which is typically eight data bits and represents the measurement of one set of traces, is supplied to a microcontroller 22. The microcontroller 22 causes the relevant portion of the pad to be scanned. Further, the microcontroller 22 and in some embodiments an associated host (not shown) then processes the information in a conventional manner to generate cursor and control signals. In an exemplary embodiment the microcontroller 22 is linked to the host through an industry standard interface, such as PS/2, ADB, serial or other suitable connection.

Figure 3:
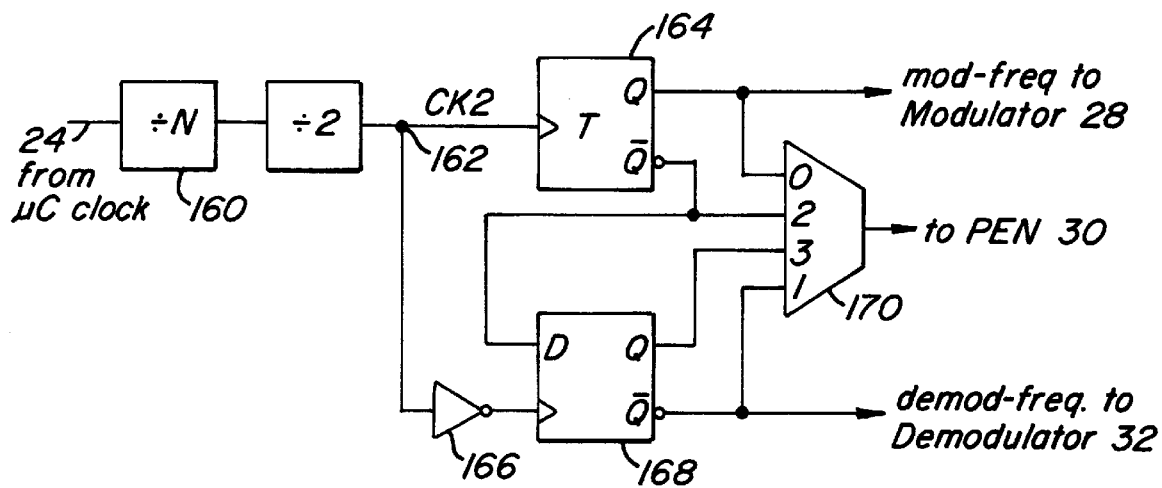
FIG. 3 shows a frequency generator of the type used in the implementation of FIG. 1.

With reference next to FIG. 3, the frequency generator circuit 26 of FIG. 1 may be understood in greater detail. In particular, the clock signal 24 from the microcontroller 22 passes through a "divide by N" stage 160 to generate a 50% duty cycle signal on line 162. A further "divide by two" stage 164 may be provided if the output of the "divide by N" stage 160 is not at 50% duty cycle. The signal on line 162 is then provided as the clock of a T flip-flop 164 and also as the input to a inverter 166. The inverted output $\overline{Q}$ of the flip-flop 164 provides the D input to a D flip-flop 168, while the output of the inverter 166 provides the clock input to the flip-flop 168. The Q output of the T flip-flop 164 is supplied as the modulator frequency output 28, but also provides one input to a four input mux 170. The remaining three inputs to the mux 170 are provided by the $\overline{Q}$ output of the flip-flop 164, the Q output of the D flip-flop 168, and the $\overline{Q}$ output of the flip-flop 168. The output of the mux 170 is the phase programmable clock signal 30; the $\overline{Q}$ output of the flip-flop 168 provides the demodulator frequency signal 32.

The relationship between the phase programmable clock signal 30, which is provided to an active pen 20 such as shown in FIG. 1, and the demodulator signal 32 depends upon the particular implementation. In some implementations, it is desirable to have an active pen appear substantially similar to a finger when detected by the sensor. In this instance the clock signal 30 will be such that the voltage appearing at the tip of the pen is substantially out of phase with the demodulator signal 32. However, in other embodiments it may be desirable to be able to distinguish an active pen from a finger, in which case the clock signal 30 will be configured to cause the voltage appearing at the tip of the pen to be substantially the same phase as the demodulator signal 32. In the event a "same phase" relationship is implemented, the waveform sensed due to the presence of the active pen will be opposite to that caused by a finger or an "out of phase" active pen. Compensation for such opposite waveforms may be required within the firmware.

Figure 4:
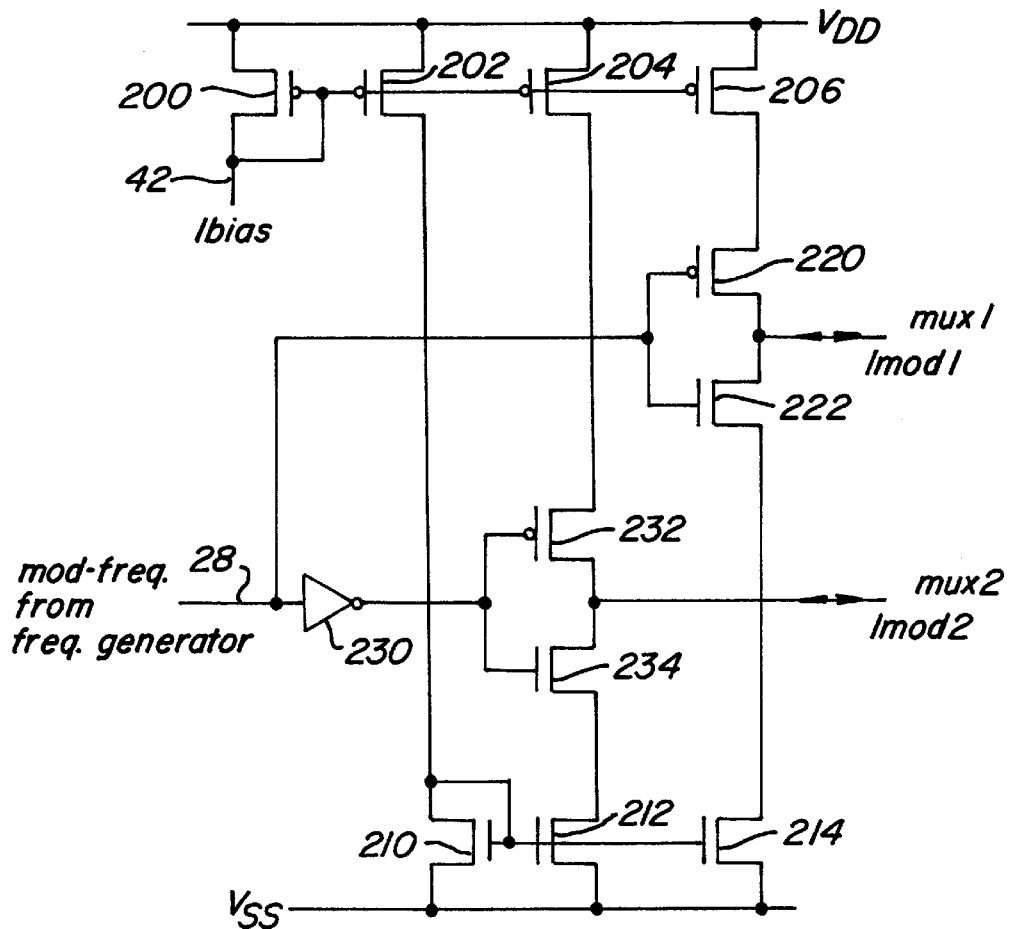
FIG. 4 shows an implementation of a modulator such as shown in FIG. 1.

Referring next to FIG. 4, the modulator circuit 40 shown in FIG. 1 may be better appreciated. In particular, the bias signal 42 is supplied to a transistor 200, and its current is mirrored across transistors 202, 204 and 206, all of which are PMOS transistors. A complementary trio of NMOS transistors 210, 212 and 214 forming current mirrors are also provided. The modulator frequency signal 28 is supplied to the gate of a first CMOS transistor pair 220 and 222, and also to the input of an inverter 230, which in turns supplies a second transistor pair 232 and 234. The output $I_{MOD1}$ is supplied on the line MUX1, while the output $I_{MOD2}$ is supplied on the line MUX2. As noted previously, if it is preferred to sense only a single trace, one of the transistor pairs may be disabled or eliminated.

Figure 5:
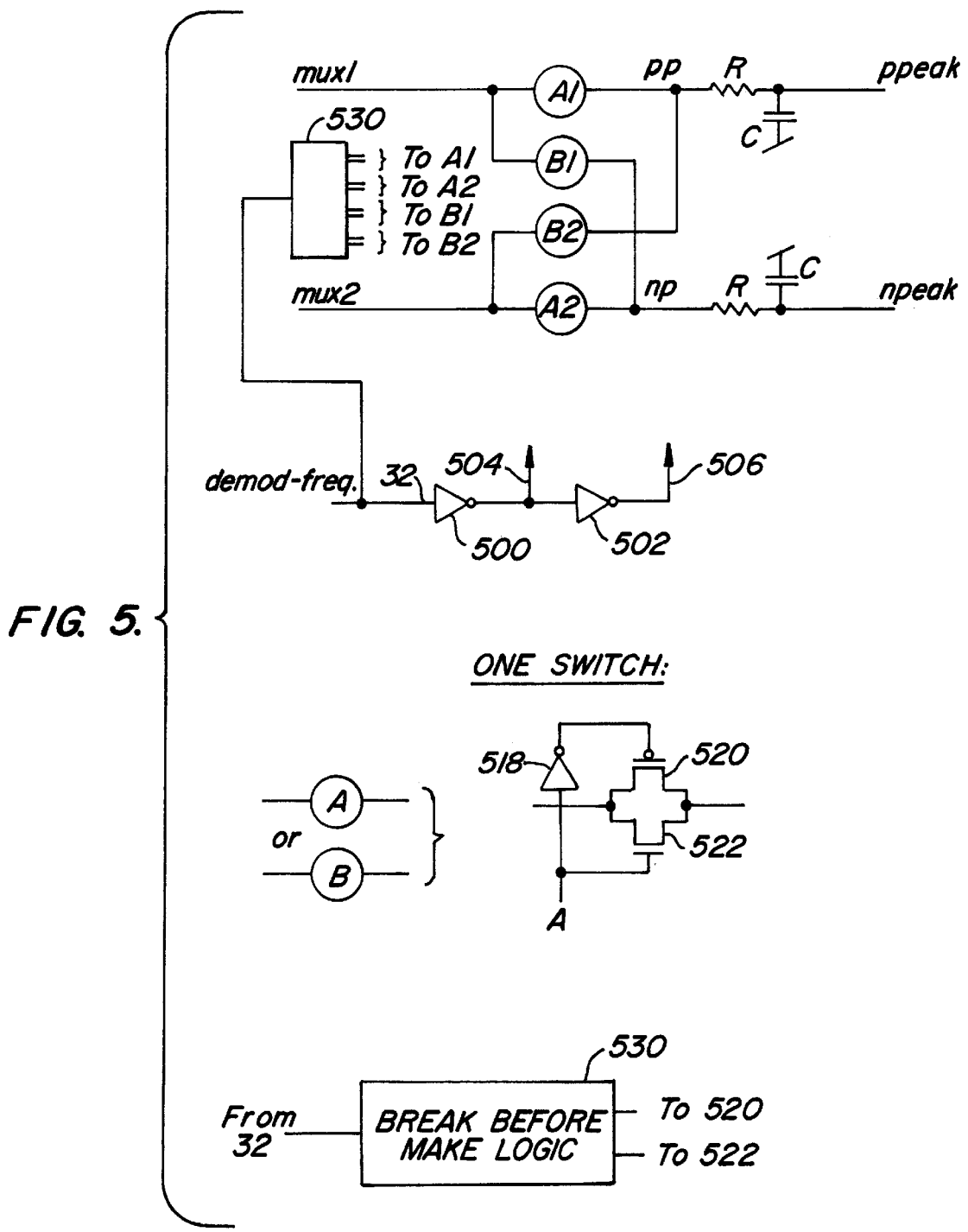
FIG. 5 shows a demodulator of the type shown in FIG. 1.

Referring next to FIG. 5, the demodulator of FIG. 1 may be better appreciated. In particular, the signal MUX1 is provided as the input to a pair of switching stages A1 and B1, while the signal MUX2 is provided as the input to a pair of switching stages A2 and B2. The switching stages A1–A2 and B1–B2, which are implemented with analog CMOS switches, act as a synchronous full wave rectifier. The demodulator frequency signal 32 is supplied to a first inverter 500 and then to a second inverter 502. A control signal 504 is taken from the output of the inverter 500 and supplied to switching stages A1 and A2, while a control signal 506 is taken from the output of the inverter 502 and supplied to switching stages B1 and B2.

Each switching stage A1, A2, B1 and B2 is identical, and comprises an inverter 518 having as its input either the control signal 504 or 506. The inverter 518 provides the gate input to a transistor 520, while the control signal (either 504 or 506) provides the gate input to a second transistor 522. The sources and drains of the opposed transistors 520 and 522 are connected, and serve as the inputs and outputs of the respective switching stages.

The outputs of the switching stages A1 and B2 are tied together as signal PP, while the outputs of the switching stages B1 and A2 are tied together as signal NP. The signals PP and NP are supplied, respectively, to a pair of low pass RC filters which serve to eliminate a significant amount of detection ripple. The low pass RC filters provide the signals ppeak and npeak as their output.

In an exemplary embodiment, "break-before-make" logic 530 may also be provided to avoid possible overcurrent conditions. The "break-before-make" logic essentially implements appropriate delays to ensure that the switches A1–A2 are off before switches B1–B2 are turned on, and vice versa. If such "break-before-make" logic 530 is implemented, it receives an input signal from the demodulator frequency signal 32, and provides a pair of outputs for each switching stage A1, A2, B1 and B2, or a total of eight outputs. In such an implementation, the inverter 518 is not used, and instead each pair of outputs drives the associated transistors 520 and 522 directly, with appropriate delays relative to the other pairs of signals to ensure the first switching stages are turned off before their complement turns on.

Figure 6:
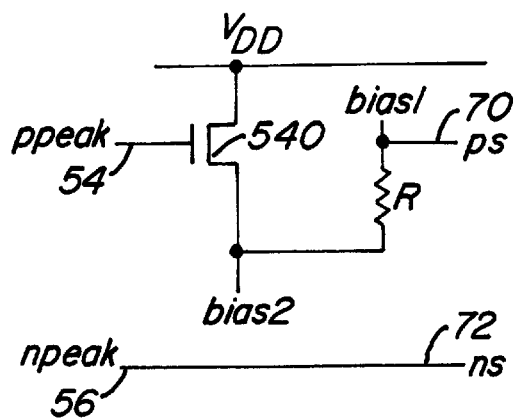
FIG. 6 shows a subtractor circuit of the type shown in FIG. 1.

Referring next to FIG. 6, the subtractor circuit of FIG. 1 may be better understood. The signal ppeak provides the gate input to a transistor 540, the drain of which is tied to $V_{DD}$ and the source of which is tied to a bias signal BIAS2. The BIAS2 signal is also supplied to one end of a resistor R, which is tied to a BIAS1 signal at its other end. The BIAS1 and BIAS2 signals are provided as separately programmable signals by the bias generator cell 46, discussed in connection with FIG. 1. The node connecting the signal BIAS1 to the resistor R provides the output signal PS, or line 70. The signal npeak passes through the subtractor circuit without change, and is provided as the output NS on line 72. The transistor 540 subtracts one threshold voltage, typically one volt, and also allows fine control over the shift voltage by the amount of BIAS2−BIAS1. In this context, the shift function correlates to subtraction. The resistor R gives a coarse but acceptable control over the shift voltage, typically in 150 mV steps, by means of the BIAS1 signal. The subtraction is required to accommodate the limited dynamic range of the differential pair 74. It will be noted that the subtraction circuit 58 is in some respects a crude implementation for which there are many alternatives, but is inexpensive to implement and adequate to perform the necessary functions.

Figure 7:
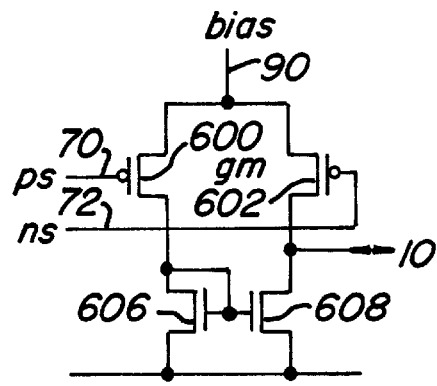
FIG. 7 shows a differential voltage to current convertor circuit of the type shown in FIG. 1.

With reference now to FIG. 7, the differential pair 74 may be better understood. The signals PS and NS provide the gate inputs to a differential pair of transistors 600 and 602, the sources of which are both connected to a BIAS signal from the bias generator cell 46 shown in FIG. 1. The drains are connected to a pair of transistors 606 and 608 forming a tail current mirror, with their gates connected to the drain of the transistor 600. The output $I_0$ of the stage is taken between the drain of the transistor 602 and the drain of the transistor 608. The sources of both transistors 606 and 608 are tied to ground. In operation, an increase in finger pressure causes an increase in the current flowing through transistors 600, 606 and 608. In contrast, the current through the transistor 602 decreases, leading to an overall decrease of the signal $I_0$ flowing out of the differential pair 74.

Figure 8A:
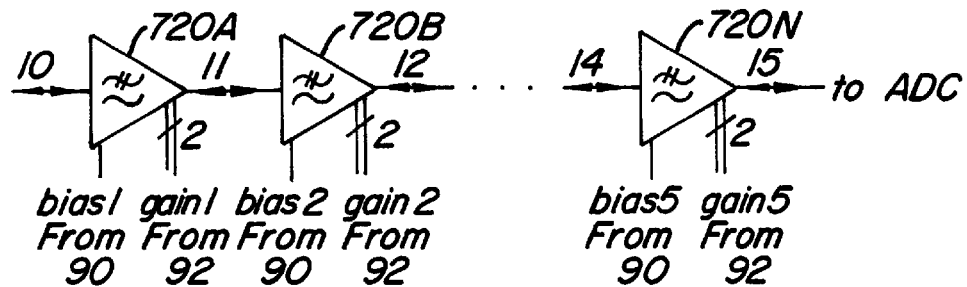
FIGS. 8A–8C show a multistage amplifier/filter circuit of the type shown in FIG. 1, and the circuitry used for each stage.
Figure 8B:
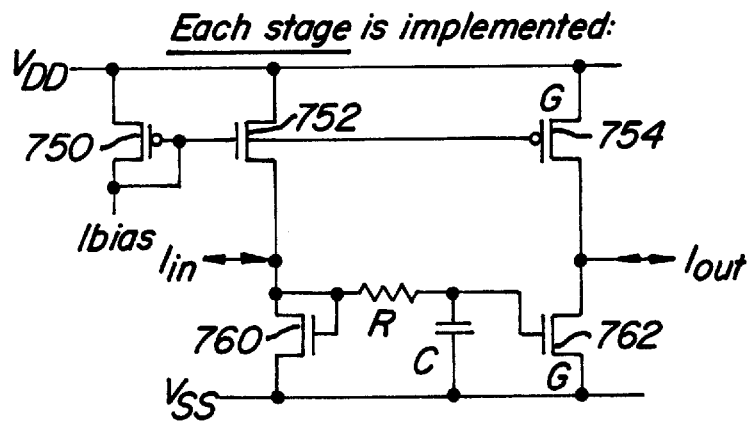

Now referring to FIGS. 8A and 8B, the amplifier/filter stage 84 may be better understood. As previously noted, the amplifier portion may comprise a plurality of programmable gain stages 720A–720N daisy-chained together, and in an exemplary embodiment comprises five stages. The input $I_0$ serves as the first input, with each stage receiving associated BIAS and GAIN inputs. The several BIAS inputs are each supplied by the bias generator 46, while the several GAIN inputs, shown collectively at 92 in FIG. 1, are supplied by the microcontroller 22. The GAIN control signals, may be, for example, a total of five two bit words. The output $I_5$ of the final stage is provide to the A-D converter 94.

Referring particularly to FIG. 8B, the details of each stage 720 may be appreciated. A plurality of transistors 750, 752 and 754 are configured together with transistors 760 and 762 as a programmable current mirror, where the gain G is controlled by the appropriate ones of gain signals 92 and can be from one to three. The BIAS signal $I_{BIAS}$ connects to the drain of the transistor 750, and also connects between the gates of the transistors 750, 752 and 754. The input signal $I_{in}$, such as $I_0$ to $I_4$, connects between the transistors 752 and 760, and the gate of the transistor 760. An RC low pass filter is connected between the gates of the transistors 760 and 762, although the RC circuit is implemented by means of transistors to minimize cost while providing acceptable performance. The output $I_{out}$ of the stage is taken between the transistors 754 and 762, and provides the input to the next stage. The gain of the stage may be expressed as $$I_{out} = I_{in}[G/(1+jwRC)].$$

In an exemplary embodiment the gain of the five stages is on the order of twenty-four.

Figure 8C:
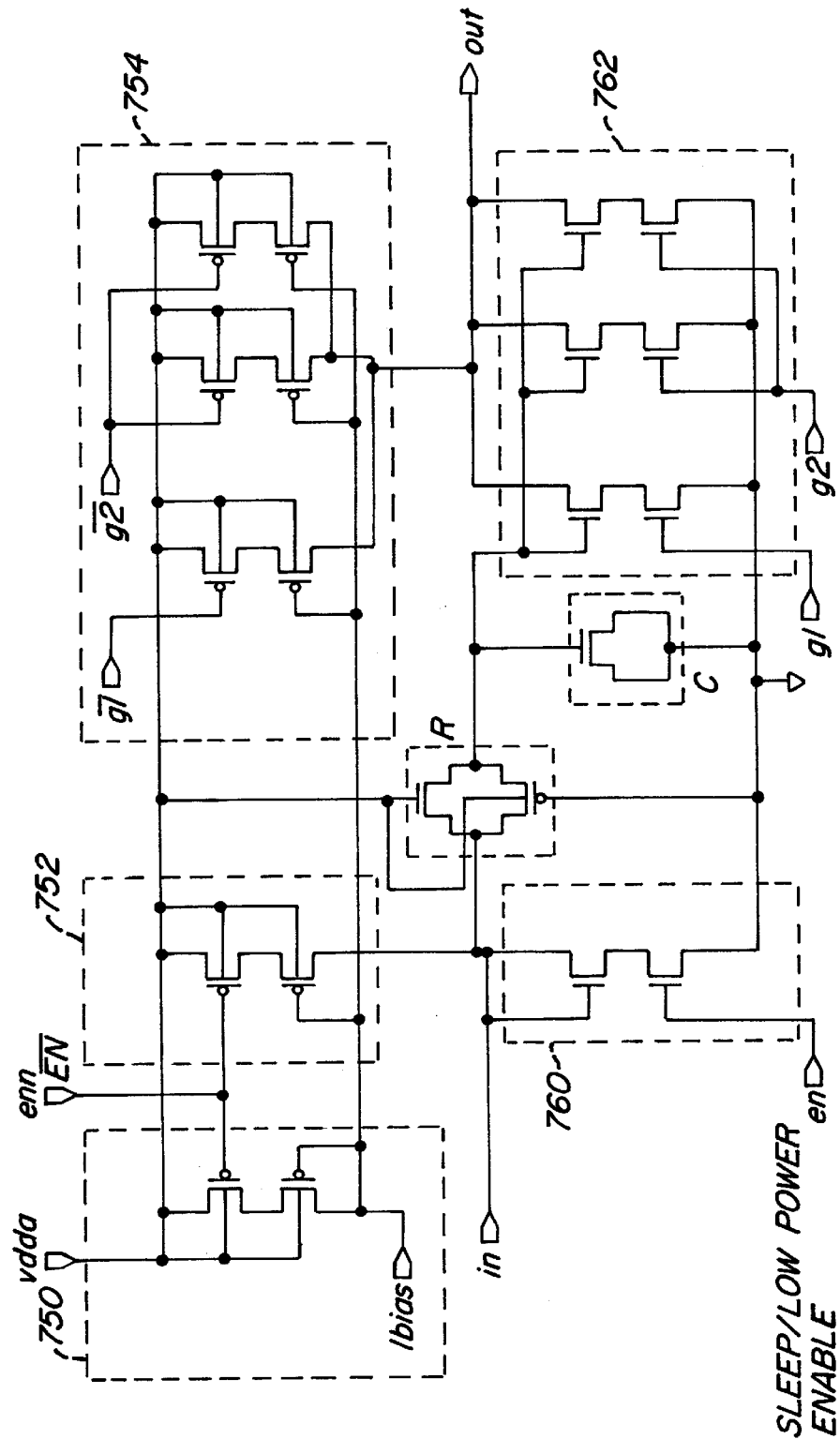

It will be appreciated by those skilled in the art that the schematic shown in FIG. 8B, as with many of the circuits shown herein, is simplified from the actual circuit for purposes of clarity. An actual implementation of the circuit of FIG. 8B is shown in FIG. 8C, in which the portions of FIG. 8C which perform the related functions shown in FIG. 8B are labeled with the reference numerals found in FIG. 8B. The implementation shown in FIG. 8C also shows the gain control signals G1 and G2, and their inverted counterparts. An enable signal EN, and its inverted counterpart, may be provided for placing the circuit in low power mode, such as sleep or standby.

Figure 9:
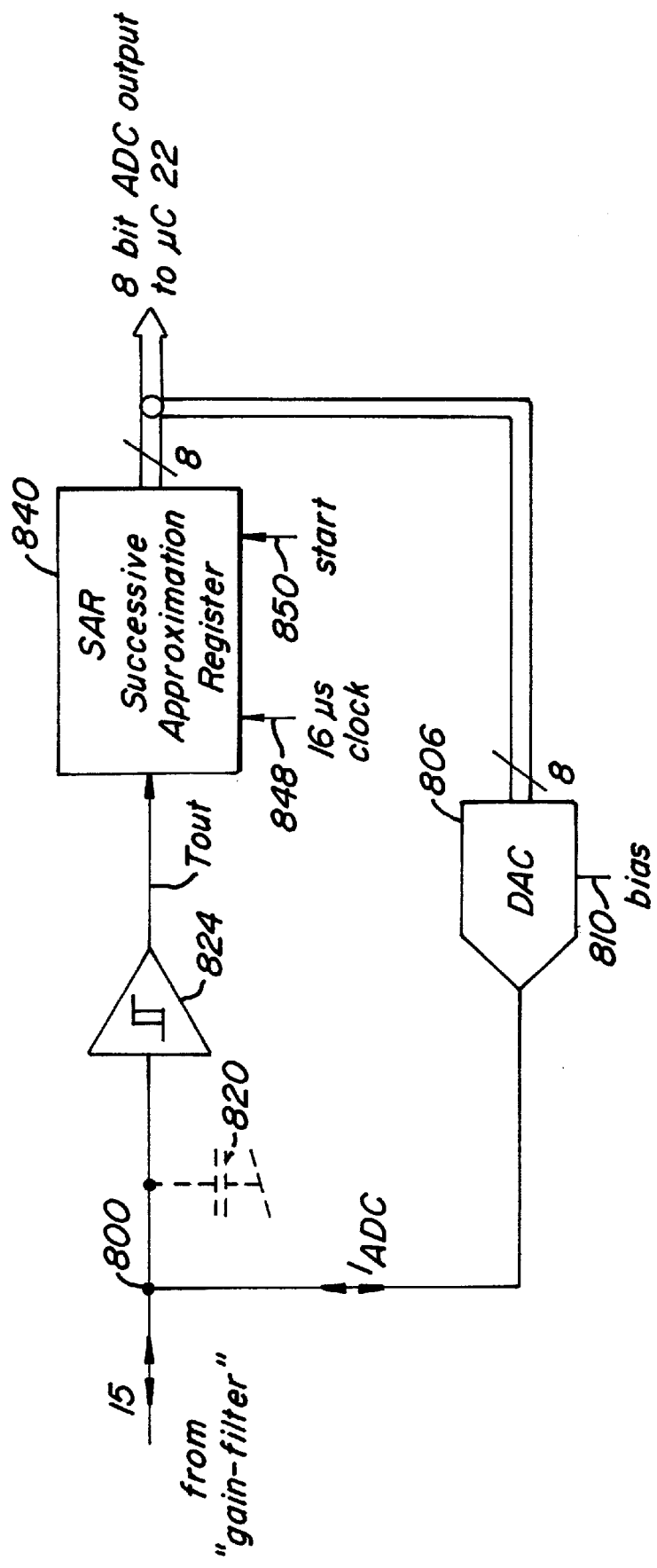
FIG. 9 shows a current input analog to digital converter of the type shown in FIG. 1.

Referring now to FIG. 9, the current ADC circuit 94 is shown in greater detail. The bipolar current input $I_5$ is supplied to a current summing node 800, where it is summed with a bipolar current $I_{ADC}$ supplied by a current switching DAC 806, for example an R-2R type. A bias signal 810 is supplied to the DAC 806.

The summed current $I_5 + I_{ADC}$ at the node 800 is integrated as the result of the parasitic node capacitance at the input to a Schmitt trigger 824. The Schmitt trigger may be a standard CMOS comparator with, for example, 100 mV hysteresis; in an exemplary embodiment, this drives the output of the Schmitt trigger $T_{OUT}$ as follows:

$$T_{OUT} = 0 \text{ if } (I_5 + I_{ADC}) < 0$$

and $$T_{OUT} = 1 \text{ if } (I_5 + I_{ADC}) > 0.$$

The signal $T_{OUT}$ from the Schmitt trigger 824 is supplied to a successive approximation register, or SAR, 840, which is clocked with a clock signal 848 and provided with a start signal 850. The clock signal 848 may, in an exemplary embodiment, be on the order of 16 $\mu$seconds. The output of the SAR 840 is an eight bit output which is supplied to the DAC 806 and also provides the output to the microcontroller 22. It will be appreciated that higher finger pressure results in higher values of $I_5$ flowing in the amplifier/filter 84, and in turn out of the ADC circuit 94. This results in higher ADC conversion results delivered to the microcontroller 22.

It will be appreciated from the foregoing that a new and novel method and apparatus for synchronously driving and sensing the traces of a touch sensor has been described, with differential current sensing used to increase sensitivity and aid in noise rejection. The method and apparatus may be used to detect one or more fingers, or passive or active pens. In addition, provision is made to drive and sense simultaneously a plurality of traces on the pad, such that the presence of a finger anywhere on the pad is immediately detected.

Having fully described various embodiments of the present invention, numerous alternatives and equivalents which do not depart from the invention will be apparent to those skilled in the art. It is therefore intended that the invention not be limited by the foregoing description, but only by the appended claims.

What is claimed is:

1. A method for detecting the presence of a finger or other appropriate object in proximate relationship to a touchpad comprising providing a modulator signal suitable for driving at least one trace of a touchpad sensor, providing a demodulator signal substantially in quadrature with the modulator signal for synchronously sensing the response of the at least one trace to the modulator signal, and converting the response to a digital indicia.

2. The method of claim 1 wherein the step of providing a modulator signal includes providing a pair of modulator signals for driving two traces.

3. The method of claim 1 wherein the step of providing a demodulator signal includes synchronously sensing positive and negative peaks of the response of the at least one trace to the modulator signal.

4. The method of claim 3 wherein the positive and negative peaks are sensed differentially.

5. A method for detecting the presence of a finger or other appropriate object in proximate relationship to a touchpad comprising providing a drive signal suitable for driving at least one trace of a touchpad sensor to yield a signal having a series of positive and negative peaks, differentially detecting the positive and negative peaks, converting the differential response to a single ended response, and converting the single ended response to a digital indicia.

6. The method of claim 5 wherein the step of providing the drive signal includes providing drive signals for at least two traces.

7. A method for detecting the presence of a finger or other appropriate object in proximate relationship to a touchpad comprising providing a drive current for driving at least one trace of a touchpad sensor, synchronously sensing a responsive signal from the at least one driven trace, converting the responsive signal to a digital indicia.

8. A method for detecting substantially immediately, the presence of a finger or other appropriate object in proximate contact with a touch pad comprising the steps driving with a drive signal a plurality of traces sufficient to represent the entirety of the touch pad, sensing the plurality of traces, detecting a variation in capacitance representative of a finger or appropriate object in proximate contact with the touch pad without regard to the location of the finger or other object on the touch pad, generating, in response to the detection step, a signal indicative of the presence or absence of a finger or other appropriate object, and causing the touch pad to exit low power mode.

9. A method for detecting the presence of a finger or other appropriate object in proximate relationship to a touchpad comprising providing a clock signal to a pen means, providing a demodulator signal of a predetermined phase relative to the clock signal provided to the pen means for synchronously sensing a signal generated on at least one trace of a touchpad by the pens means, and converting the response to a digital indicia.

10. The method of claim 9 wherein the clock signal to the pen means is substantially in phase with the demodulator signal.

11. The method of claim 9 wherein the clock signal to the pen means is out of phase with the demodulator signal.

12. A touch sensing system comprising modulator means for generating at least one modulator signal, multiplexor means for directing the at least one modulator signal to at least one trace of a touch sensor, and demodulator means, responsive to a signal from the at least one trace and a demodulator frequency signal substantially in quadrature with the modulator signal, for generating a detection signal indicative of the capacitance of the at least one trace.

13. A touch sensing system for detecting, substantially immediately, the presence of a finger or other appropriate object in proximate contact with a touch sensor comprising modulator means for generating a drive signal, multiplexor means for directing the drive signal to a plurality of traces of a touch sensor sufficient to represent the entirety of the touch pad and for providing at least one output signal, demodulator means responsive to the at least one output signal for detecting a variation in capacitance representative of a finger or other appropriate object in proximate contact with the touch pad without regard to the location of the finger or other object on the touch pad, and detection means responsive to the demodulator means for generating an output signal.

14. The method of claim 9 further including the step of providing a modulator signal suitable for driving at least one trace of a touchpad sensor, the modulator signal being substantially in quadrature with the demodulator signal.

* * * * *